Patented Mar. 9, 1937

2,073,398

UNITED STATES PATENT OFFICE 2,073,398

ACTIVATED MAGNESIUM HYDROXIDE AND METHOD OF MANUFACTURE

Heinz H. Chesny, San Mateo, Calif., assignor to Marine Chemicals Company, Ltd., San Francisco, Calif., a corporation of Delaware No Drawing. Application December 26, 1934, Serial No. 759,244

3 Claims. (Cl. 23—201)

This invention relates generally to the manufacture of a magnesium product having chemical and physical properties making it valuable for use in many industrial processes, as for example as a decolorizer and absorbing agent or as a neutralizer and chemical reagent.

It is an object of the invention to provide a dry magnesium hydroxide product of the above character which has activated chemical and physical properties compared with magnesium hydroxide which has been produced in the past.

Another object of the invention is to provide a process or method for the manufacture of my product which will enable commercial production at a relatively low cost.

In carrying out the process of the present invention I first produce a highly hydrated form of magnesium hydroxide, in a suspension or slurry of the magnesium hydroxide with water. In this connection, I prefer to utilize a method for the manufacture of magnesium hydroxide as set forth in my co-pending application Serial No. 709,159, filed January 31, 1934. Briefly, the method disclosed in that application consists in reacting a suitable brine, such as ocean water, with a milk of lime containing considerable lime in free solution. By proper control of the commingling of the milk of lime with the brine, as disclosed in said application, a highly hydrated form of magnesium hydroxide is precipitated in the form of agglomerated flocks having a relatively high settling rate. These flocks are then permitted to settle in the mother liquor and are withdrawn as a slurry from the settling vat.

The slurry or suspension obtained as described above is then treated in a suitable manner for the removal of impurities and in order to effect further concentration. Concentration can be effected in a suitable filtering apparatus such as is disclosed in my co-pending application Serial No. 682,903, filed July 31, 1933, and washing can be effected by a process such as is disclosed in my co-pending application Serial No. 623,369, filed July 19, 1932. The resulting purified concentrate may contain from 10% to 15% magnesium hydroxide.

In the precipitating method referred to above, particularly where the brine is ocean water, a large percentage of chlorides is contained in the slurry as removed from the settling vat. Such chlorides, if permitted to remain, would obviate obtaining the desired activated characteristics in the final product. Therefore, I prefer that washing or purification be carried out to such an extent that the magnesium hydroxide on the dry basis contains not more than 0.7% and preferably less than 0.28% of chlorides, expressed as sodium chloride.

All of the steps of the method thus far described, to produce a purified base containing about 10% to 15% magnesium hydroxide, should be carried out in such a manner as to avoid detrimental growth of magnesium hydroxide crystals. Growth of relatively large crystals would detrimentally affect the particle size and the activated properties of the final product. Furthermore, crystalline growth, even if it appears not to increase the particle size, causes a loss in water of hydration from the magnesium hydroxide while suspended in water. As will be presently explained, it is desirable that the material be relatively highly hydrated before the last step of the method. To avoid crystalline growth, care should be taken to avoid seeding of the material with crystals of magnesium hydroxide, and to avoid long storage of the material in successive treatments. In this connection, it will be noted that the method of precipitation disclosed in my aforesaid application Serial No. 709,159 makes possible a rapidly settling, highly hydrated form of magnesium hydroxide. Therefore, the magnesium hydroxide need not be stored for excessively long periods in the settling vat. Likewise, the filtering apparatus disclosed in my aforesaid co-pending application Serial No. 682,903, and the washing process disclosed in application Serial No. 623,369, make possible purification and washing in a substantially continuous system, without long intervening periods of storage.

Heating of the hydrous magnesium hydroxide to elevated temperatures such as are required in drying for considerable periods of time, say over several minutes or more, causes a very marked crystalline growth. Consequently, the last step of the method is to rapidly dry the purified and concentrated slurry to produce the final powdered product. In an installation which I have operated, this drying is carried out by a spray-type desiccator equipped with a centrifugal atomizer. To effect efficient drying, the concentration of the magnesium hydroxide should be as high as possible consistent with proper atomization, as for example from 10% to 12%. A suitable drying gas, such as hot gaseous products of combustion, is introduced into the chamber of the desiccator at temperatures ranging from 800° to 1200° Fahrenheit. The relatively finely-divided particles discharged from the centrifugal atomizer are introduced into the hot drying gas to effect substantially instantaneous evolution of water. The temperatures and the duration of treatment by the drying gas should of course be such as to avoid any substantial conversion of magnesium hydroxide to magnesium oxide or magnesium carbonate, and to avoid reabsorption of moisture. Absorption of carbon dioxide from the drying gas is avoided by maintaining the temperature of the gas above 750° Fahrenheit, thus exceeding the decomposition partial pressure of magnesium carbonate and thereby preventing its formation. Likewise, immediately after drying, the powdered material should be separated from the drying gas.

The product obtained by the process described above is a dry powder of relatively small particle size. My invention enables production of this powder in its ultimate particle form directly, without grinding of the material as it leaves the dryer. The average particle size of my product is from 2 to 5 microns, while when drying the same magnesium hydroxide slurry slowly and grinding the resultant material in a ball mill or other equipment capable of exceedingly fine disintegration, it is difficult to reduce the average particle size below 20 microns. The sodium chloride content of my material does not exceed 1.0% of the magnesium hydroxide, and is preferably below 0.4%. A typical analysis is as follows:

| | | Percent |
|---|---|---|
| Magnesium hydroxide | $Mg(OH)_2$ | 94.2 |
| Calcium oxide | $CaO$ | .9 |
| Carbon dioxide | $CO_2$ | 2.0 |
| Silica | $SiO_2$ | .32 |
| Alumina | $Al_2O_3$ | .08 |
| Iron oxide | $Fe_2O_3$ | .05 |
| Sulphates, as | $SO_3$ | .21 |
| Chlorides, as | $NaCl$ | .44 |
| Moisture | $H_2O$ | 1.80 |

In bulk my material is relatively light in weight and does not tend to pack. For example, a mass of the material analyzing in accordance with the preceding example, possesses an apparent density of 28 to 36 pounds per cubic foot.

With respect to chemical characteristics, my product has a relatively high rate of solution. Assuming manufacture in accordance with the preferred method outlined herein, the product has been found to have a rate of solution of about 4.62 grams of magnesium hydroxide per minute (in a normal solution of HCl). It has been found that if a magnesium hydroxide slurry such as used in my method is dried at a relatively slow rate, the resulting product has a rate of solution of about 1.475, which is attributed to the fact that slow drying is conducive to crystalline growth. In practice the actual rate of solution varies considerably with changes in the concentrations of the reacting products. The figures cited above refer specifically to the addition of normal hydrochloric acid from a burette to a suspension of three grams of magnesium hydroxide in 50 cc. of distilled water, the acid being added to the suspension at a rate adjusted to maintain exact neutrality as indicated by the color of methyl orange indicator. Since the rate of solution is a direct index of chemical reactivity, it is evident that my product is of value as a neutralizer in chemical reactions. When used for this purpose the material not only is economical but serves to effect rapid and substantially complete neutralization.

The physical activity of the present product cannot compare with the product disclosed and claimed in my co-pending application Serial No. 642,268, filed November 11, 1932. However, it is materially more effective in absorbing various substances, such as coloring material, than dry magnesium hydroxide previously available upon the market. Likewise, the product of said co-pending application does not have a high rate of solution as specified above, since it is formed by slow drying, which is conducive to crystalline growth.

The activated properties of my product are believed due to several factors of the preferred method described herein, which serve to afford a substantially amorphous form and an exterior surface conducive to high absorptivity and reactivity. As previously indicated, spray drying such as described reduces the suspension to dry form with such rapidity and with such a short period of contact with the drying gas, as to avoid growth of crystals. A short period of contact with the hot drying gas also avoids reabsorption of moisture contained in the drying medium or contamination by any carbon dioxide which may be present. The absence of detrimental quantities of chlorides (e. g., NaCl) in the suspension, avoids glazing of the particles, such as would materially impair activity.

The novel characteristics described above make it possible to utilize my product in many industrial processes. For example, it is often desirable, as in the treatment of lubricating oils, to neutralize acid solutions. This can be accomplished by adding a solid alkali which is in itself insoluble in neutral solutions, but the product of neutralization of which is highly soluble. Consequently, only that portion of the solid neutralizer which reacts with the acidic compounds present, is consumed. My product is particularly applicable to neutralizing operations of this character, and the small particle size afforded makes it possible to maintain a suspension of the magnesium hydroxide in the solution or liquid to be neutralized, whereby the reaction proceeds at a rapid rate to exact neutral point.

I claim:

1. In a process of the character described, forming a suspension of hydrous magnesium hydroxide with water, atomizing the suspension, and causing the atomized particles to be contacted for a short period of time with a hot drying gas to form a dry magnesium hydroxide powder.

2. In a process of the character described, forming a suspension of hydrous magnesium hydroxide with water by precipitating magnesium hydroxide from brine containing convertible magnesium salts, atomizing the suspension, and then contacting the atomized particles for a short period of time with a hot drying gas to form a dry magnesium hydroxide powder.

3. In a process of the character described, forming a suspension of hydrated magnesium hydroxide with water, the suspension being formed by precipitating magnesium hydroxide from brine containing convertible magnesium salts followed by washing of the precipitate to remove chlorides, atomizing the suspension, and causing the atomized particles to contact with a hot drying gas for a relatively short duration of time to form a dry magnesium hydroxide powder.

HEINZ H. CHESNY.